United States Patent
Lee et al.

(10) Patent No.: US 9,527,554 B2
(45) Date of Patent: Dec. 27, 2016

(54) OFFSHORE WIND POWER GENERATOR, LIFTING JIG FOR TRANSFERRING THE OFFSHORE WIND POWER GENERATOR, AND METHOD AND SYSTEM FOR INSTALLING THE OFFSHORE WIND POWER GENERATOR USING THE LIFTING JIG

(75) Inventors: Byung Kyu Lee, Geoje-si (KR); Dong Ho Cho, Yuseong-gu (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 138 days.

(21) Appl. No.: 14/131,667

(22) PCT Filed: Feb. 17, 2012

(86) PCT No.: PCT/KR2012/001207
§ 371 (c)(1),
(2), (4) Date: Jun. 26, 2014

(87) PCT Pub. No.: WO2013/008986
PCT Pub. Date: Jan. 17, 2013

(65) Prior Publication Data
US 2014/0300112 A1 Oct. 9, 2014

(30) Foreign Application Priority Data
Jul. 8, 2011 (KR) ........................ 10-2011-0067964

(51) Int. Cl.
*B63B 27/30* (2006.01)
*F03D 11/00* (2006.01)
(Continued)

(52) U.S. Cl.
CPC ............... *B63B 27/30* (2013.01); *B66C 1/108* (2013.01); *B66C 23/00* (2013.01); *B66C 23/185* (2013.01);
(Continued)

(58) Field of Classification Search
CPC ................ E02B 9/00; E02B 9/02; E02B 9/08; B63B 27/10; B66C 23/185; B66C 1/108; B66C 1/42
(Continued)

(56) References Cited

U.S. PATENT DOCUMENTS 7,887,261 B2 * 2/2011 Stubler et al. ................. 405/209
8,235,629 B2 * 8/2012 Jakubowski .................. 405/224
(Continued)

FOREIGN PATENT DOCUMENTS

CN 101468774 7/2009
EP 2261080 A1 12/2010
(Continued)

OTHER PUBLICATIONS

Extended European Search Report dated Mar. 25, 2015 for European Patent Application No. 12812108.4.
(Continued)

*Primary Examiner* — Tara M. Pinnock
(74) *Attorney, Agent, or Firm* — Ladas & Parry, LLP

(57) ABSTRACT

The present invention relates to an offshore wind power generator, a lifting jig for transferring the offshore wind power generator, and a method for installing the offshore wind power generator using the lifting jig. The offshore wind power generator according to an embodiment of the present invention includes a blade, a nacelle including a power generator for generating power by the rotation of the blade, and a tower supporting the nacelle and installed on a support structure installed offshore. Also, the offshore wind power generator includes a tower support structure installed on the tower so that the tower is lifted using a predetermined transfer unit in a state where the blade, the nacelle, and the tower are integrally assembled. The tower support structure is disposed above a center of gravity of the wind power
(Continued)

generator at which the blade, nacelle, and the tower are integrally assembled.

3 Claims, 13 Drawing Sheets

(51) Int. Cl.
| | |
|---|---|
| F03D 11/04 | (2006.01) |
| E04H 12/34 | (2006.01) |
| E02D 31/00 | (2006.01) |
| F03D 1/00 | (2006.01) |
| B66C 1/10 | (2006.01) |
| B66C 23/00 | (2006.01) |
| B66C 23/18 | (2006.01) |
| F03D 9/00 | (2016.01) |
| E02D 27/52 | (2006.01) |

(52) U.S. Cl.
CPC ............ *E02D 27/52* (2013.01); *E02D 31/002* (2013.01); *E04H 12/342* (2013.01); *F03D 1/001* (2013.01); *F03D 9/002* (2013.01); *F05B 2230/61* (2013.01); *F05B 2230/6102* (2013.01); *F05B 2240/916* (2013.01); *F05B 2240/95* (2013.01); *Y02E 10/727* (2013.01); *Y02E 10/728* (2013.01); *Y02P 70/523* (2015.11); *Y10T 29/4932* (2015.01); *Y10T 29/49321* (2015.01)

(58) Field of Classification Search
USPC ................................................ 405/195.1–228
See application file for complete search history.

(56) References Cited

U.S. PATENT DOCUMENTS

| | | | |
|---|---|---|---|
| 8,801,331 B2 * | 8/2014 | Perner et al. ................. | 405/204 |
| 8,820,254 B2 * | 9/2014 | Tosello ....................... | 114/61.1 |
| 2008/0240864 A1 * | 10/2008 | Belinsky .................... | 405/223.1 |
| 2009/0028647 A1 | 1/2009 | Bingham | |
| 2010/0219645 A1 * | 9/2010 | Yamamoto et al. ............ | 290/55 |
| 2011/0139056 A1 | 6/2011 | Cholley et al. | |
| 2013/0051924 A1 * | 2/2013 | Willis et al. ............... | 405/195.1 |
| 2013/0052015 A1 * | 2/2013 | Velund ............................ | 416/85 |
| 2013/0101359 A1 * | 4/2013 | Maier ........................... | 405/224 |
| 2013/0121770 A1 * | 5/2013 | Li et al. ........................ | 405/207 |

FOREIGN PATENT DOCUMENTS

| | | |
|---|---|---|
| EP | 2 641 825 | 9/2013 |
| JP | 2009-281288 A | 12/2009 |
| JP | 2010-208723 A | 9/2010 |
| WO | 2011/028102 | 3/2011 |

OTHER PUBLICATIONS

International Search Report for PCT/KR2012/001207 mailed on Sep. 26, 2012.

* cited by examiner

OFFSHORE WIND POWER GENERATOR, LIFTING JIG FOR TRANSFERRING THE OFFSHORE WIND POWER GENERATOR, AND METHOD AND SYSTEM FOR INSTALLING THE OFFSHORE WIND POWER GENERATOR USING THE LIFTING JIG

CROSS-REFERENCE TO RELATED APPLICATIONS

This application is the U.S. National Stage of International Patent Application No. PCT/KR2012/001207 filed on Feb. 17, 2012, which claims priority to Korean Patent Application No. 10-2011-0067964, filed on Jul. 8, 2011, the disclosures of which are hereby incorporated in their entireties by reference.

TECHNICAL FIELD

The present invention relates to an offshore wind power generator, and more particularly to an offshore wind power generator, a lifting jig for transferring the offshore wind power generator, and a method and a system for installing the offshore wind power generator using the lifting jig.

BACKGROUND ART

A wind power generator comprises a rotor configured to rotate by wind, a drive train to convert rotational force into power, and a tower and foundation to support the rotor and the drive train. Because a wind power generator is installed at neighboring sea or deep sea, significant differences in time and costs spent for installation occur depending upon sea environmental conditions and climate conditions. Accordingly, shortening of installation period at sea is a core technology in design of an offshore wind power generator.

A conventional offshore wind power generator is installed at sea such that a blade, rotor and nacelle assembly and tower sections are separately transported to an installation area in the sea by ships and are assembled together at sea. Recently, an offshore wind power generator installation method to reduce a period of installing a wind power generator at sea has been developed, in which all turbine components except a foundation are previously assembled on the land, transported to an installation area, and joined to an offshore foundation by lifting the whole wind power generator.

In general, when installing such a preassembled wind power generator at sea, a lower part of a tower of the wind power generator is lifted using a transport machine such as a crane, and the wind power generator is transported and engaged with a joining part of an offshore foundation.

However, in the installation method of lifting a lower part of the wind power generator using a crane and transporting the same, a center of gravity of the wind power generator is not positioned at the center of the tower of the wind power generator, and is positioned at an eccentric position from the center of the tower toward the blade of the wind power generator.

Accordingly, in order to prevent the wind power generator from turning over, the wind power generator should be lifted tilting rearward. However, it is difficult to install the wind power generator if lifted in a tilted state.

Further, lifting the wind power generator in a tilted state may cause decrease in safety due to a risk of the wind power generator overturning while the same is moved and quality deterioration due to damage of inner components, oil leakage or the like.

Additionally, in order to keep a balance of the wind power generator that is lifted and transported in a tilted state, it is necessary to provide an additional spreader beam at a middle of the wind power generator in order to support the tower, which may cause increase in installation costs and weight of the wind power generator and damage of a non-reinforced thin portion of the tower which is in contact with the spreader beam if the balance is lost during transport.

DISCLOSURE

Technical Problem

Therefore, the present invention has been made in view of the above problems, and it is an object of the present invention to provide an offshore wind power generator capable of being stably installed at sea.

It is another object of the present invention to provide an offshore wind power generator installation method having a low risk of overturn of the offshore wind power generator while the same is installed.

It is a further object of the present invention to provide an offshore wind power generator installation method in which the wind power generator is lifted in a perpendicular direction to the surface of the sea, transported and installed at sea.

It is a yet further object of the present invention to provide an offshore wind power generator including a tower having a low natural frequency.

Technical Solution

In accordance with an aspect of the present invention, the above and other objects can be accomplished by the provision of an offshore wind power generator installation system including a tower support structure mounted to a tower of an offshore wind power generator and disposed above a center of gravity of the offshore wind power generator, a lifting jig to support the tower support structure of the offshore wind power generator, and a transport machine to lift the lifting jig at both sides of the tower.

The tower support structure may protrude outward from an outer peripheral surface of the tower.

The tower support structure may be formed in a ring shape, and may have an outer peripheral surface which has a greater radius than an outer peripheral surface of the tower.

The tower support structure may be provided with coupling protrusions which protrude downward from a bottom surface thereof.

The lifting jig may be formed with coupling holes into which the coupling protrusions are fitted.

The lifting jig may include a ring-shaped frame disposed around an outer peripheral portion of the tower of the offshore wind power generator in order to support the tower support structure mounted to the outer peripheral portion of the tower, a support frame unit coupled to the ring-shaped frame in order to support the ring-shaped frame, and ring coupling parts formed at the support frame unit, to which a portion of the transport machine to transport the offshore wind power generator is coupled.

The support frame unit may have a truss structure.

The support frame unit may be formed symmetrically in a left or right direction about a center of the ring-shaped frame.

The support frame unit may include a pair of first frames arranged near both sides of the ring-shaped frame in order to support the ring-shaped frame, and a pair of second frames to connect both end portions of the pair of first frames. The ring coupling parts may be formed at the pair of second frames.

The ring-shaped frame may be disposed beneath the tower support structure and may support the tower by contacting the tower support structure.

The transport machine may be an offshore crane, and the portion of the transport machine may be a lifting ring of the offshore crane.

In accordance with another aspect of the present invention, there is provided an offshore wind power generator having a blade, a nacelle provided with a power generator configured to generate power by rotation of the blade, and a tower configured to support the nacelle and mounted to an offshore foundation, the offshore wind power generator including a tower support structure mounted to the tower so that the offshore wind power generator is lifted using a transport machine after the blade, the nacelle and the tower are integrally assembled. The tower support structure may be disposed above a center of gravity of the offshore wind power generator in which the blade, the nacelle and the tower are integrally assembled.

The tower support structure may protrude outward from an outer peripheral surface of the tower.

The tower support structure may be formed in a ring shape, and may have an outer peripheral surface which has a greater radius than an outer peripheral surface of the tower.

The tower support structure may be provided with coupling protrusions which protrude downward from a bottom surface thereof.

In accordance with a further aspect of the present invention, there is provided a lifting jig to transport an offshore wind power generator, the lifting jig including a ring-shaped frame disposed around an outer peripheral portion of a tower of the offshore wind power generator in order to support a tower support structure mounted to the outer peripheral portion of the tower, a support frame unit coupled to the ring-shaped frame in order to support the ring-shaped frame, and ring coupling parts formed at the support frame unit, to which a portion of the transport machine to transport the offshore wind power generator is coupled.

The support frame unit may have a truss structure.

The support frame unit may be formed symmetrically in a left or right direction about a center of the ring-shaped frame.

The support frame unit may include a pair of first frames arranged near both sides of the ring-shaped frame in order to support the ring-shaped frame, and a pair of second frames to connect both end portions of the pair of first frames. The ring coupling parts may be formed at the pair of second frames.

The ring coupling parts may be formed symmetrically in a left or right direction about a center of the ring-shaped frame.

The ring-shaped frame may include a first arc-shaped frame and a second arc-shaped frame which are coupled to each other to form a ring shape. The first arc-shaped frame may be fixedly coupled to any one of the pair of first frames, and the second arc-shaped frame may be coupled to the other one of the pair of first frames such that the second arc-shaped frame is separated from or coupled to the first arc-shaped frame.

The other one of the pair of first frames may have an end portion which is pivotably coupled to any one of the pair of second frames, and the other end portion which is separately coupled to the other one of the pair of second frames.

The first arc-shaped frame and the second arc-shaped frame may be formed with coupling recesses at inner surfaces thereof, into which the tower support structure is inserted.

The ring-shaped frame may be disposed beneath the tower support structure and may support the tower by contacting the tower support structure.

The tower support structure may be provided with coupling protrusions which protrude downward from a bottom surface thereof, and the ring-shaped frame is formed with coupling holes into which the coupling protrusions are fitted.

In accordance with a yet further aspect of the present invention, there is provided a method of installing an offshore wind power generator to an offshore foundation using the above-described offshore wind power generator installation system, the method including disposing a lifting jig above a center of gravity of a tower of the offshore wind power generator, connecting an offshore crane to both sides of the lifting jig, lifting the offshore wind power generator using the offshore crane, and coupling the offshore wind power generator to the offshore foundation.

The connecting the offshore crane to both sides of the lifting jig may include preparing two or more separate offshore cranes which are mounted to a ship or preparing two or more separate offshore cranes which are mounted respectively to two or more ships.

The method may further include transporting the offshore wind power generator, in which a blade, a nacelle and a tower are previously assembled on the land, to the offshore foundation using a carrying ship.

Advantageous Effects

In accordance with an aspect of the present invention, the offshore wind power generator is stably installed at sea, and accordingly a risk of overturn during the installation thereof is reduced.

In accordance with another aspect of the present invention, a natural frequency of the tower of the offshore wind power generator is set low.

DESCRIPTION OF DRAWINGS

The above and other objects, features and other advantages of the present invention will be more clearly understood from the following detailed description taken in conjunction with the accompanying drawings, in which.

BEST MODE

Figure 1:
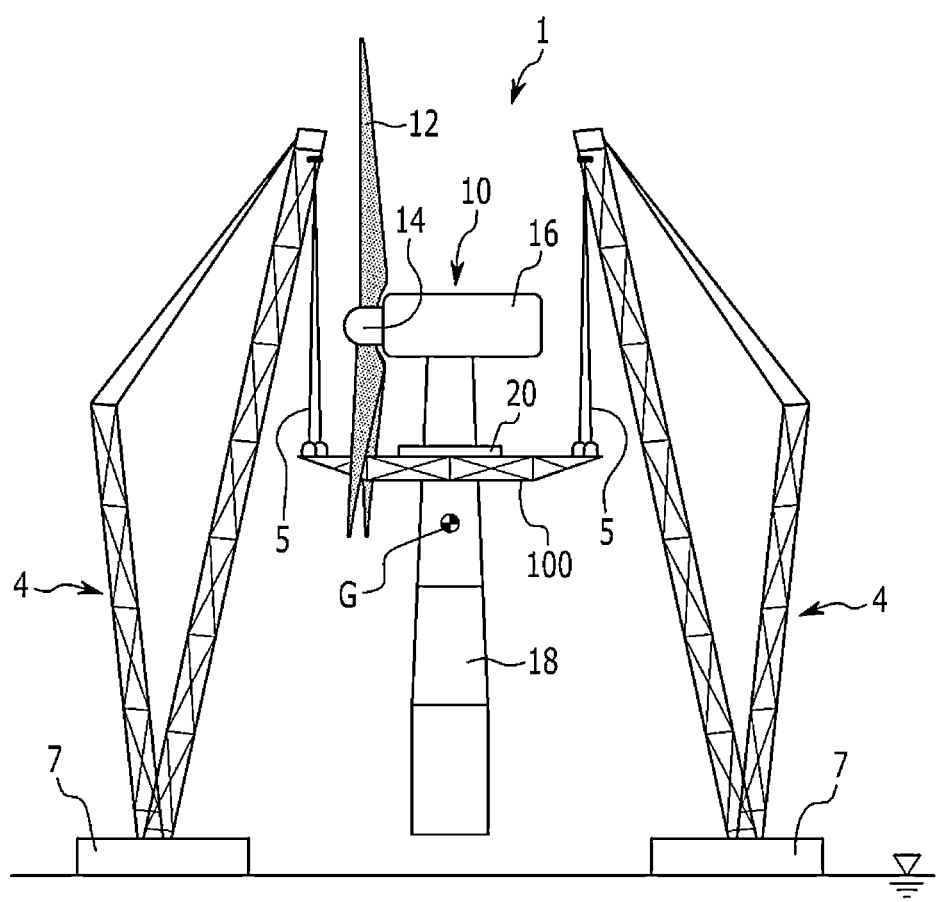
FIG. 1 is a constitutional view of an offshore wind power generator installation system according to an embodiment of the present invention.

Now, preferred embodiments of the present invention will be described in detail with reference to the accompanying drawings so that the above and other aspects of the present invention will be easily understood and realized by those skilled in the art. The preferred embodiments described in the following specification and shown in the accompanying drawings are not intended to represent all aspects of the invention, so that it is to be understood that various equivalents and modifications can be made. In the drawings, elements unrelated to the embodiments of the present invention are omitted from depiction for clarity. In the following specification and the accompanying drawings, the same or similar elements are denoted by the same reference numerals.

FIG. 1 is a constitutional view of an offshore wind power generator installation system 1 according to an embodiment of the present invention.

Referring to FIG. 1, an offshore wind power generator installation system 1 according to an embodiment of the present invention comprises a tower support structure 20, a lifting jig 100 and a transport machine.

The tower support structure 20 is disposed above a center of gravity G of an offshore wind power generator 10. So as to be lifted by the transport machine, the offshore wind power generator 10 may be supported by the lifting jig 100 according to an embodiment, or may be coupled to the lifting jig according to another embodiment. Detailed explanation of the tower support structure 20 will be given later.

According to the embodiments of the present invention, there is provided a lifting jig 100 which supports the tower support structure 20 or is coupled to the tower support structure 20.

The lifting jig 100 is formed with ring coupling parts 130 (refer to FIG. 3) at both end portions thereof, to which lifting rings of the transport machine, e.g., offshore cranes 4 provided at ships 7, are coupled so as to lift the lifting jig 100. The embodiments of the present invention explained below include an offshore crane 4 as an exemplary embodiment of the transport machine.

The offshore wind power generator installation system 1 according to an embodiment of the present invention is configured to lift the tower support structure 20 disposed above the center of gravity G of the wind power generator 10 by the transport machine using the lifting jig 100, thereby stably lifting the offshore wind power generator 10, in which a blade 12, a nacelle 16 and a tower 18 are assembled, at sea.

Hereinafter, each constitutional element of the offshore wind power generator installation system 1 according to an embodiment of the present invention will be described in detail with reference to the drawings.

Figure 2:
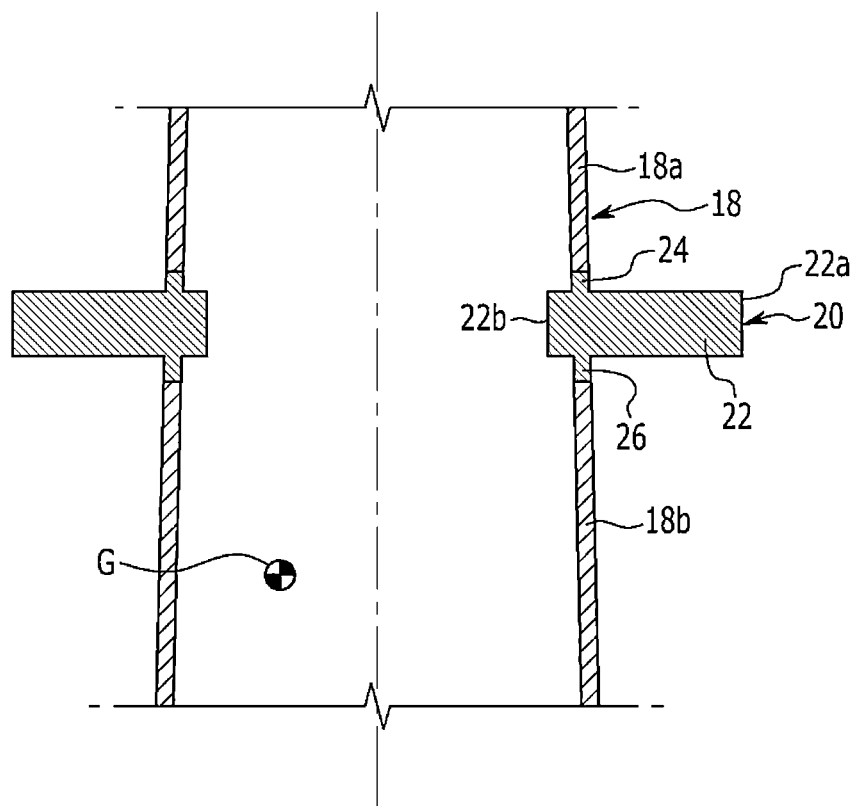
FIG. 2 is a partial sectional view of the offshore wind power generator installation system according to an embodiment of the present invention.

FIG. 2 is a partial sectional view of the tower 18 to explain the tower support structure 20 of the offshore wind power generator installation system 1 according to an embodiment of the present invention.

As known from FIGS. 1 and 2, the offshore wind power generator installation system 1 according to an embodiment of the present invention includes the tower support structure 20 which is provided at the tower 18 of the wind power generator 10.

The tower support structure 20 is a rigid element protruding outward from an outer peripheral surface of the tower 18. In this embodiment, the tower support structure 20 is formed in a ring shape.

Referring to FIG. 2, the ring-shaped tower support structure 20 includes a ring-shaped body 22, a ring-shaped upper coupling part 24 protruding upward from a top surface of the ring-shaped body 22, and a ring-shaped lower coupling part 26 protruding downward from a bottom surface of the body 22.

Referring to FIG. 2, an outer peripheral surface 22a of the ring-shaped body 22 has a larger radius than an outer peripheral surface of the tower 18. Therefore, the outer peripheral surface of the ring-shaped body 22 protrudes outward from the outer peripheral surface of the tower 18.

The outer peripheral surface 22a of the ring-shaped body 22 may have a larger radius than an outer peripheral surface of a lower end portion of the tower 18.

When the wind power generator 10 is transported using a carrying ship in order to install the wind power generator at sea, the lifting jig 100 may be displaced on a deck on which the lower end of the tower is positioned, which will be described in detail later.

An inner peripheral surface 22b of the ring-shaped body 22 has a smaller radius than an inner peripheral surface of the tower 18, so that the inner peripheral surface of the ring-shaped body 22 protrudes inward from the inner peripheral surface of the tower 18.

In the body 22 structured as above, the ring-shaped upper coupling part 24 formed at the top surface of the body 22 may be coupled to a lower end of an upper section 18a of the tower 18, which is positioned on the tower support structure 20, by welding. However, the coupling method is not limited to welding.

Also, the ring-shaped lower coupling part 26 formed at the bottom surface of the body 22 may be coupled to an upper end of a lower section 18b of the tower 18, which is positioned beneath the tower support structure 20, by welding. However, the coupling method is not limited to welding.

According to an embodiment of the present invention, the tower support structure 20 is disposed above the center of gravity G of the wind power generator 10 in which the blade 12, the nacelle 16 and the tower 18 are assembled.

When the tower support structure 20 is lifted by the crane 4 after mounting the lifting jig 100 to the tower support structure 20, the tower support structure 20 can be stably lifted because the center of gravity G of the wind power generator 10 is positioned below the lifting jig 100.

Although it has been described that the tower support structure 20 in this embodiment is a rigid element which is coupled to the upper section 18a and the lower section 18b of the tower 18 by welding, the tower support structure 20 may be modified into various other types, e.g., a truss structure in which a plurality of bar frames are coupled to each other, only if the structure can be supported by the lifting jig 100 so that the tower 18 can be lifted by the crane 4.

In addition to the role as a structure capable of being coupled to the lifting jig 100 in order to lift the tower, the tower support structure 20 according to an embodiment of the present invention also has a function to increase the weight of the tower 18. Since the weight of the tower 18 mounted with the tower support structure 20 is greater than the weight of a tower without the tower support structure, a natural frequency of the tower 18 becomes low. As the natural frequency of the tower 18 is low, resonance of the generator and the tower can be avoided when the wind power generator is installed.

As described in this embodiment of the present invention, if the weight of the tower 18 is increased by mounting the tower support structure 20, as a passive control device to keep the natural frequency of the tower 18 low while keeping the rigidity of the lower end portion of the tower 18 high, to a position above the center of gravity of the tower 18, the natural frequency of the tower 18 is reduced correspondingly thereto. The weight of the tower support structure 20 mounted to the tower 18 may be decided in consideration of the weight of the tower 18 so that the tower 18 has a desirable natural frequency.

Although it has been described that the tower support structure 20 in this embodiment has a ring shape and protrudes in a circumferential direction of the tower 18, the shape of the tower support structure 20 is not limited to a ring shape and may be modified into other various shapes capable of being supported by the lifting jig 100.

The offshore wind power generator installation system 1 according to an embodiment of the present invention includes the lifting jig 100 which is mounted to the tower 18 to lift the tower support structure 20 mounted to the tower of the wind power generator 10 using a transport machine such as the offshore crane 4. Hereinafter, the lifting jig 100 of the offshore wind power generator installation system 1 according to an embodiment of the present invention will be described in detail with reference to the drawings.

Figure 3:
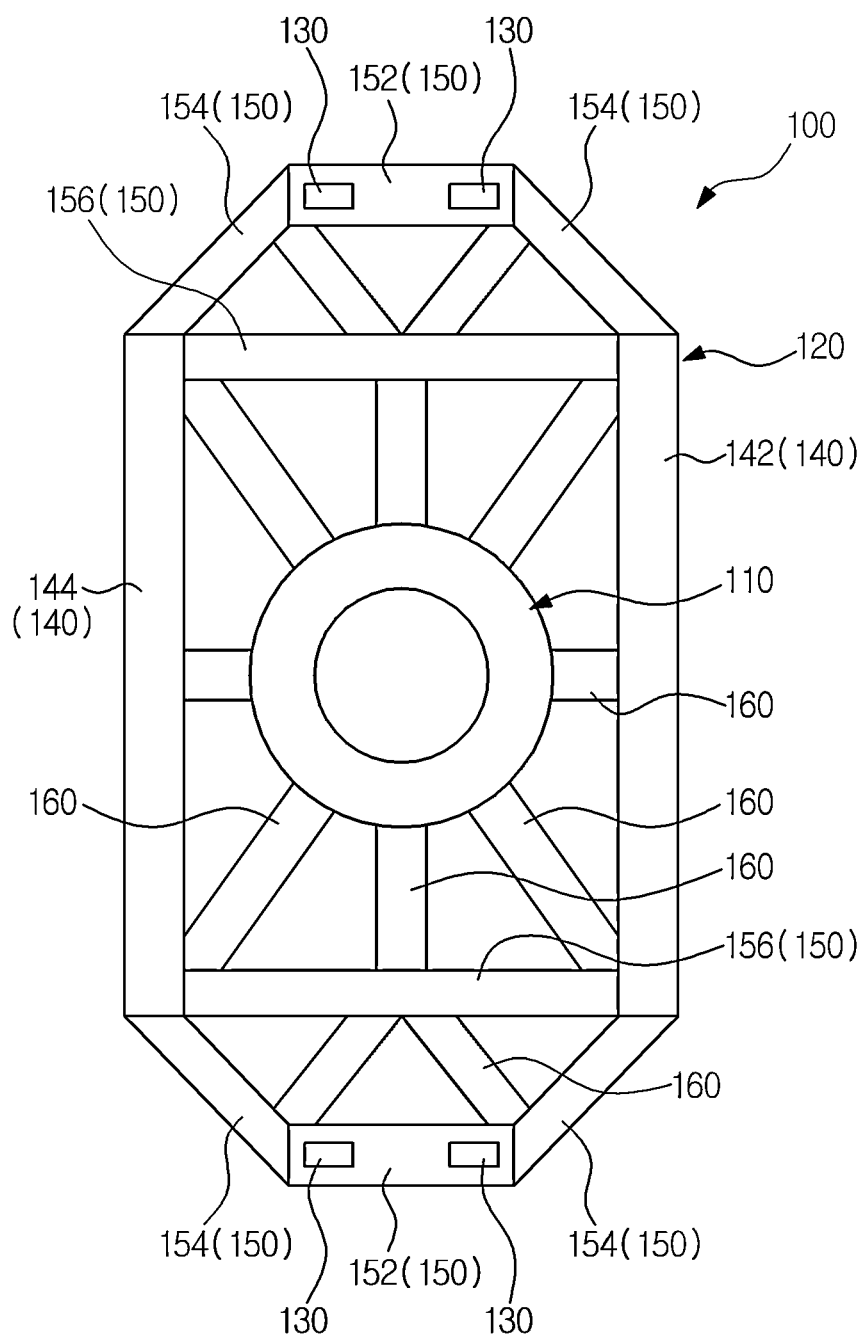
FIG. 3 is a plan view of a lifting jig according to a first embodiment in the offshore wind power generator installation system according to an embodiment of the present invention.
Figure 4:
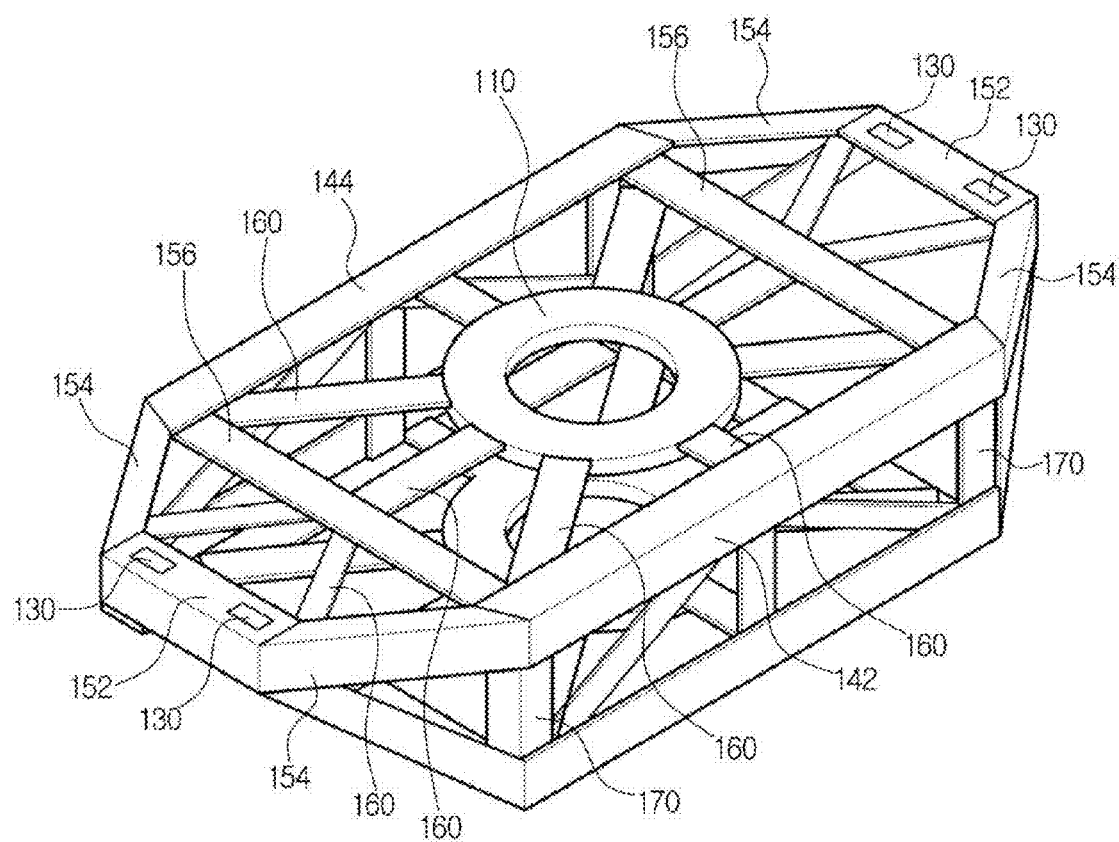
FIG. 4 is a perspective view of the lifting jig according to the first embodiment in the offshore wind power generator installation system according to an embodiment of the present invention.

FIG. 3 is a plan view of the lifting jig 100 according to a first embodiment in the offshore wind power generator installation system 1 according to an embodiment of the present invention. FIG. 4 is a perspective view of the lifting jig 100 according to the first embodiment in the offshore wind power generator installation system 1 according to an embodiment of the present invention.

In the offshore wind power generator installation system 1 according to an embodiment of the present invention, the lifting jig 100 according to the first embodiment to lift the offshore wind power generator 10 includes a ring-shaped frame 110, a support frame unit 120 and ring coupling parts 130.

The ring-shaped frame 110 is disposed at a center portion of the lifting jig 100, and is a rigid element having a ring shape in which the tower 18 of the offshore wind power generator 10 is positioned when lifting the offshore wind power generator 10 using the lifting jig 100.

The ring-shaped frame 110 may be formed such that plural arc-shaped frames are coupled to each other in an overall ring shape using coupling tools such as bolts or like.

The support frame unit 120 is mounted to the outside of the ring-shaped frame 110 in order to support the ring-shaped frame 110.

According to an embodiment of the present invention, the support frame unit 120 may be a truss structure which includes a first frame unit 140 and a second frame unit 150.

Referring to FIGS. 3 and 4, the first frame unit 140 includes a pair of first frames 142 and 144 which has a bar shape and is respectively arranged right and left of the ring-shaped frame 110 in a transverse direction when viewed from FIG. 3.

Plural connecting frames 160 are provided between the ring-shaped frame 110 and the pair of first frames 142 and 144 so that the ring-shaped frame 110 is supported by the pair of first frames 142 and 144.

The second frame unit 150 is provided at both ends of each of the pair of bar-shaped first frames 142 and 144. The second frame unit 150 functions to support the pair of first frames 142 and 144 at both ends of each of the pair of first frames 142 and 144.

Referring to FIGS. 3 and 4, the second frame unit 150 in this embodiment includes second frames 152, third frames 154 and fourth frames 156.

In this embodiment, the second frames 152, as illustrated in FIGS. 3 and 4, are positioned at end portions of the lifting jig 100 and are arranged perpendicular to the first frames 142 and 144 in a transverse direction. Each of the second frames 152 is formed with the ring coupling parts 130.

In this embodiment, the ring coupling parts 130 are holes to which lifting rings of the transport machine, i.e., the offshore crane 4, to transport the wind power generator 10 are coupled.

As illustrated in FIG. 3, the ring coupling parts 130 are formed in pair near both end portions of each of the second frames 152. Preferably, the ring coupling parts 130 are positioned symmetrically about a center of the ring-shaped frame 110.

Referring to FIG. 3, the third frames 154 are arranged obliquely so as to connect both ends of each of the second frames 152 to both ends of each of the pair of first frames 142 and 144.

The fourth frames 156 are arranged parallel with the second frames 152. Both ends of each of the fourth frames 156 are respectively coupled to the ends of the pair of first frames 142 and 144, thereby enhancing the rigidity of the lifting jig 100.

The plural connecting frames 160 are connected between the second, third and fourth frames 152, 154 and 156 so that the second, third and fourth frames 152, 154 and 156 support each other.

The connecting frames 160 are also connected between the fourth frames 156 and the ring-shaped frame 110 so that the ring-shaped frame 110 is supported by the second frame unit 150.

Referring to FIG. 4, the lifting jig 100 according to an embodiment of the present invention is structured such that two ring-shaped frames 110, the first frames 142 and 144 and the fourth frames 156 are respectively arranged parallel in a vertical direction.

Plural vertical frames 170 extending in a vertical direction are arranged to connect the ring-shaped frames 110, the first frames 142 and 144 and the fourth frames 156 which are respectively arranged in a vertical direction.

When viewed from FIG. 4, the lifting jig 100 structured as above is formed symmetrically in a forward or backward direction and in a left or right direction about the center of the ring-shaped frame 110.

As described above, since the lifting jig 100 is formed symmetrically in a forward or backward direction and in a left or right direction about the center of the ring-shaped frame 110, the wind power generator 10 is stably lifted when the tower support structure 20 of the tower 18 of the offshore wind power generator is lifted by the offshore crane 4 under the condition that the tower support structure 20 is placed on the lifting jig 100.

In the offshore wind power generator installation system according to an embodiment of the present invention, the lifting jig 100 may be formed such that the ring-shaped frame 110, the first frame unit 140 and the second frame unit 150 are coupled by a disassemblable coupling method, e.g., a bolting method, so that at least a part of the lifting jig 100 is disassembled.

The reason why at least a part of the ring-shaped frame 110, the first frame unit 140 and the second frame unit 150 is disassembled is to easily remove the lifting jig 100 from the offshore wind power generator 10 after transporting the offshore wind power generator 10 mounted with the lifting jig 100 and completely installing the offshore wind power generator 10 to offshore foundation 6 (refer to FIG. 12) using the crane 4.

Figure 5:
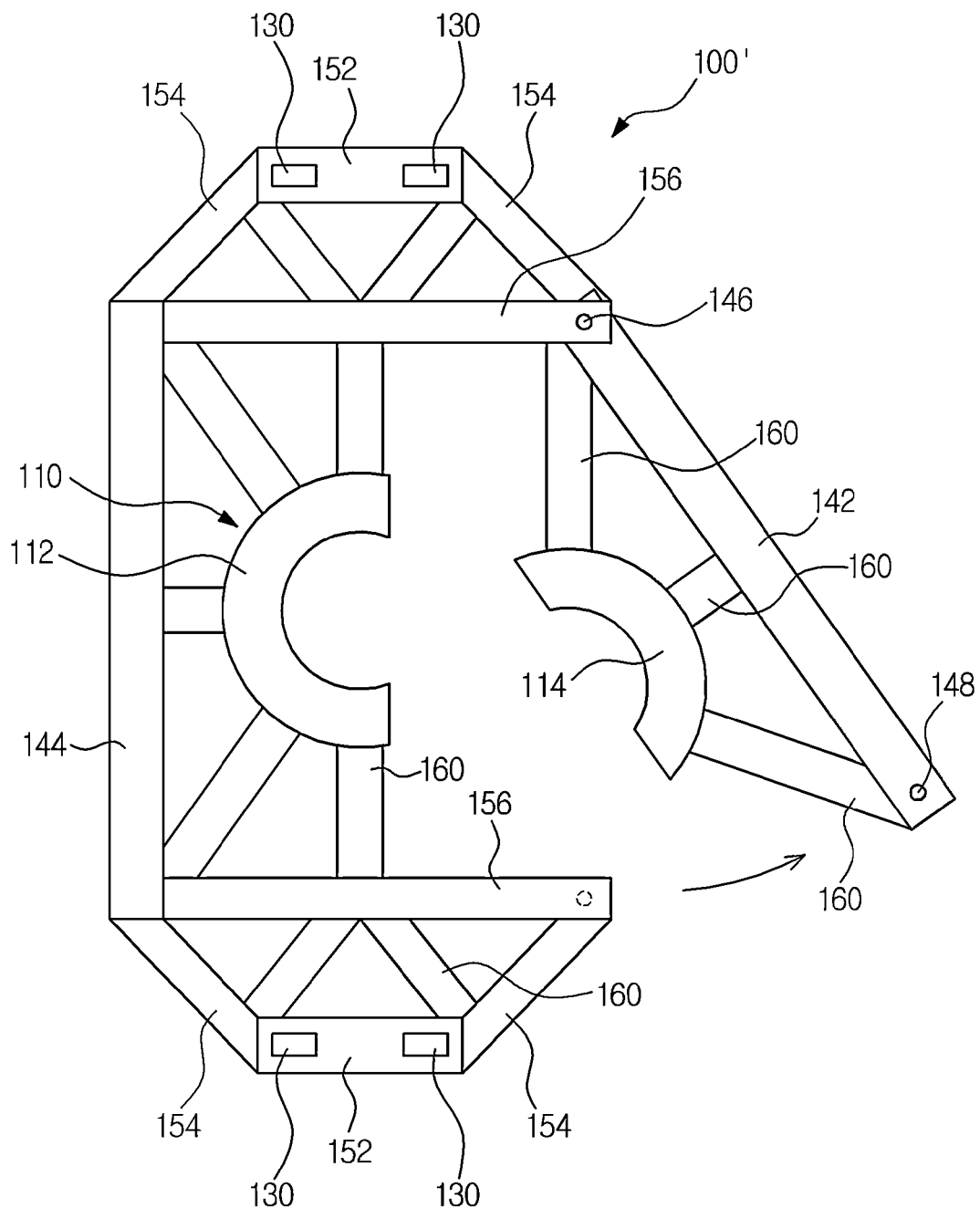
FIG. 5 is a plan view of a lifting jig according to a second embodiment in the offshore wind power generator installation system according to an embodiment of the present invention.

FIG. 5 is a plan view of a lifting jig 100' according to a second embodiment in the offshore wind power generator installation system 1 according to an embodiment of the present invention.

A lifting jig 100' according to a second embodiment illustrated in FIG. 5 is similar to the lifting jig 100 illustrated in FIGS. 3 and 4. However, the lifting jig 100' in this embodiment includes a hinge part 146 by which an end portion of the first frame 142 positioned right of the ring-shaped frame 110 is pivotably coupled to end portions of the third frame 154 and the fourth frame 156 positioned above the ring-shaped frame 110 when viewed from FIG. 5.

In addition, the other end portion of the first frame 142 is formed with a connection/disconnection part 148 by which the other end portion of the first frame 142 is separately coupled to end portions of the third frame 154 and the fourth frame 156 positioned below the ring-shaped frame 110 when viewed from FIG. 5.

The connection/disconnection part 148 may be formed such that the other end portion of the first frame 142 is coupled to the end portions of the third frame 154 and the fourth frame 156 positioned below the ring-shaped frame 110 using coupling tools such as bolts and nuts. However, the coupling method is not limited to the bolt-nut coupling.

In the embodiment depicted in FIG. 5, the ring-shaped frame 110 includes first and second arc-shaped frames 112 and 114. For example, the first and second arc-shaped frames 112 and 114 may have a semicircular shape. The first arc-shaped frame 112 is fixedly coupled to the first frame 144 positioned left when viewed from FIG. 5.

The second arc-shaped frame 114 is coupled to the first frame 142 positioned right when viewed from FIG. 5. Accordingly, as the first frame 142 positioned right when viewed from FIG. 5 pivots, the second arc-shaped frame 114 is separated from or coupled to the first arc-shaped frame 112.

The lifting jig 100' illustrated in FIG. 5 is structured such that the first arc-shaped frame 112 is fixedly disposed inside the lifting jig 100' and the second arc-shaped frame 114 is coupled to or separated from the first arc-shaped frame 112 by pivoting the first frame 142. As a result, after the offshore wind power generator 10 is completely installed to the offshore foundation 6, the lifting jig 100' is simply removed from the offshore wind power generator without necessity of disassembling every frame.

Figure 6:
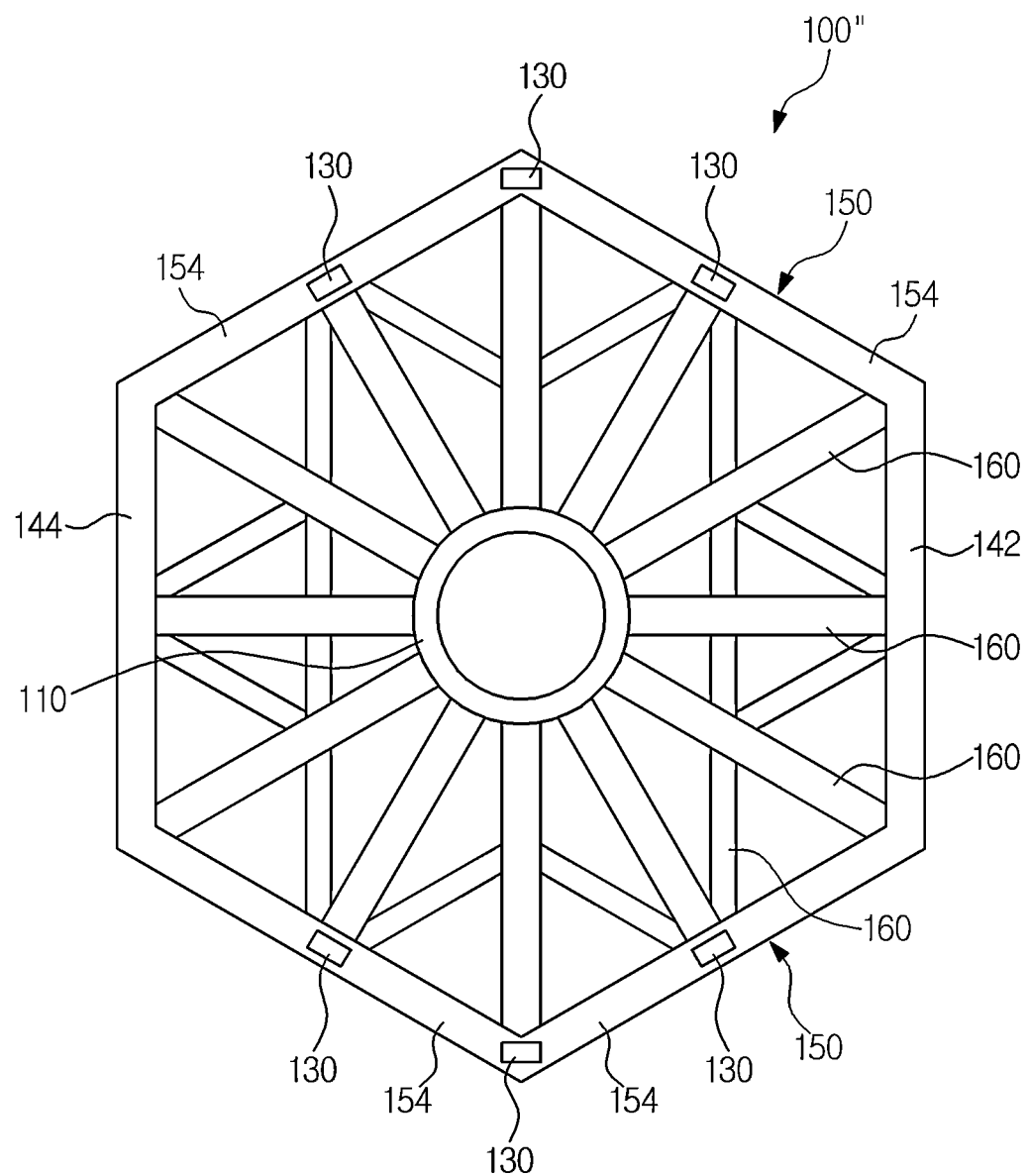
FIG. 6 is a plan view of a lifting jig according to a third embodiment in the offshore wind power generator installation system according to an embodiment of the present invention.

FIG. 6 is a plan view of a lifting jig 100" according to a third embodiment in the offshore wind power generator installation system 1 according to an embodiment of the present invention.

A lifting jig 100" according to a third embodiment illustrated in FIG. 6 has a substantially hexagonal shape, and the ring-shaped frame 110 is positioned at a center thereof when viewed from FIG. 6. A pair of first frames 142 and 144 is arranged right and left of the ring-shaped frame 110 in a vertical direction.

Since the ring-shaped frame may be formed identically to the ring-shaped frame of the aforementioned lifting jig, detailed explanation thereof will be omitted.

The lifting jig 100" according to the third embodiment is structured such that the second frame unit 150 is positioned at upper end portions and lower end portions of the pair of first frames 142 and 144 when viewed from FIG. 6.

Different from the lifting jig illustrated in FIGS. 3 and 4, the lifting jig 100" according to the third embodiment does not include the second frames 152 and the fourth frames 156 of the lifting jigs 100 and 100' of the first and second embodiments, and is structured such that four third frames 154 are disposed at an upper end portion and a lower end portion of the lifting jig 100" in FIG. 6 and coupled to each other at both upper and lower end portions to form a substantially hexagonal shape. The lifting jig 100" may be formed in a substantially regular hexagonal shape by setting a length of the third frames 154 to be the same as a length of the first frames 142 and 144, or may be formed in various other hexagonal shapes by setting a length of the third frames 154 to be greater or smaller than a length of the first frames 142 and 144 as needed.

Three ring coupling parts 130 are disposed at each of both upper and lower end portions of the lifting jig 100", to which lifting rings of the offshore crane 4 are coupled.

Plural connecting frames 160 are radially or diagonally provided among the ring-shaped frame 110, the first frames 142 and 144 and the second frame unit 150, thereby enhancing the rigidity of the lifting jig 100".

Similarly to the lifting jig 100 according to the first embodiment, the lifting jig 100" according to the third embodiment may be structured such that the ring-shaped frame 110, the first frames 142 and 144 and the second frame unit 150 are coupled to each other by coupling tools such as bolts and nuts so as to be at least partially separated from each other.

Additionally, similarly to the lifting jig 100' according to the second embodiment, the lifting jig 100" according to the third embodiment may be structured such that the ring-shaped frame 110 is divided into a first arc-shaped frame and a second arc-shaped frame and the second arc-shaped frame is separated from or coupled to the first arc-shaped frame according to pivoting of the first frame 142.

The hexagonal lifting jig 100" according to the third embodiment supports a heavier wind power generator than the lifting jigs 100 and 100' according to the first and second embodiments that have a shape extending longitudinally in one direction from the ring-shaped frame.

When it is intended to lift the offshore wind power generator 10 using the offshore crane 4, the lifting jig 100, 100' or 100" according to the first, second or third embodiment is placed beneath the tower support structure 20 of the offshore wind power generator 10 depicted in FIG. 1 and is in contact with the bottom surface of the tower support structure 20. Accordingly, if the lifting jig 100, 100' or 100" is lifted, the tower 18 is lifted together with the lifting jig 100, 100' or 100".

On the other hand, as yet another example of the lifting jig in the offshore wind power generator installation system 1 according to an embodiment of the present invention, the lifting jig may have a different structure from the above-described embodiments in order to enhance coupling force between the lifting jig and the tower support structure.

Figure 7:
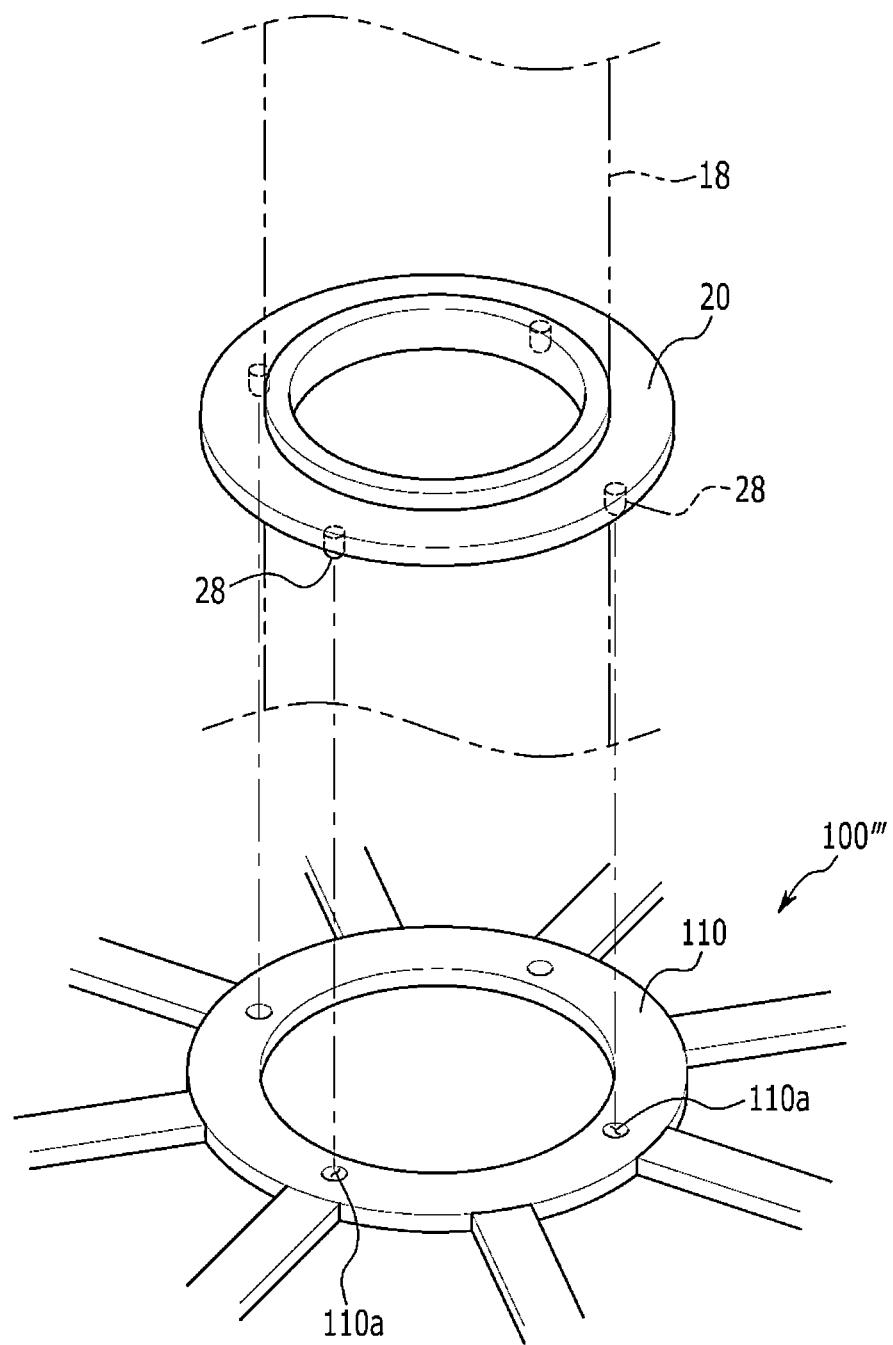
FIG. 7 is a partial perspective view illustrating a state in which a lifting jig according to a fourth embodiment is coupled to a tower support structure in the offshore wind power generator installation system according to an embodiment of the present invention.
Figure 8:
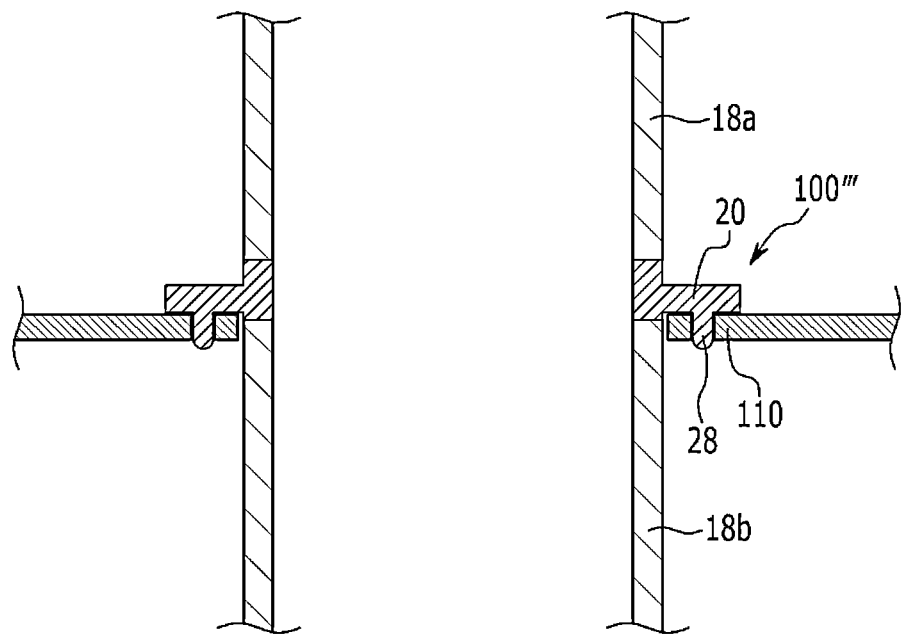
FIG. 8 is a partial sectional view illustrating a coupled state of the lifting jig depicted in FIG. 7 to the offshore wind power generator.

FIG. 7 is a partial perspective view illustrating a state in which a lifting jig 100''' according to a fourth embodiment is coupled to the tower support structure in the offshore wind power generator installation system according to an embodiment of the present invention. FIG. 8 is a partial sectional view illustrating a coupled state of the lifting jig 100''' depicted in FIG. 7 to the tower support structure 20 of the offshore wind power generator. In FIGS. 7 and 8, only a part of the ring-shaped frame of the lifting jig 100''' is illustrated in order to primarily explain different constitutions from the previous embodiments.

Referring to FIGS. 7 and 8, the lifting jig 100''' according to the fourth embodiment in the offshore wind power generator installation system 1 according to an embodiment of the present invention includes coupling holes 110*a* formed at the ring-shaped frame 110, into which coupling protrusions 28 provided at the bottom surface of the tower support structure 20 are fitted.

The coupling protrusions 28 provided at the bottom surface of the tower support structure 20 protrude downward from the bottom surface of the tower support structure 20 and are arranged apart from each other by an angle of 90 degrees.

Corresponding to the coupling protrusions 28, the ring-shaped frame 110 of the lifting jig 100''' is formed with four coupling holes 110*a* which are arranged apart from each other by an angle of 90 degrees so that the coupling protrusions 28 formed at the bottom surface of the tower support structure 20 are fitted thereinto.

As shown in FIGS. 7 and 8, if the coupling protrusions 28 is formed at the tower support structure 20 and the coupling holes 110*a* are formed at the ring-shaped frame 110 of the lifting jig 100''', when the wind power generator 10 is lifted using the lifting jig 100''', the tower support structure 20 and the lifting jig 100''' are coupled to each other in such a manner that the coupling protrusions 28 of the tower support structure 20 are fitted into the coupling holes 110*a* of the ring-shaped frame 110 of the lifting jig 100'''. Fitting the coupling protrusions 28 of the tower support structure 20 into the coupling holes 110*a* of the ring-shaped frame 110 of the lifting jig 100''' makes solid coupling between the tower support structure 20 and the lifting jig 100''' when the wind power generator 10 is transported by the offshore crane 4.

Figure 9:
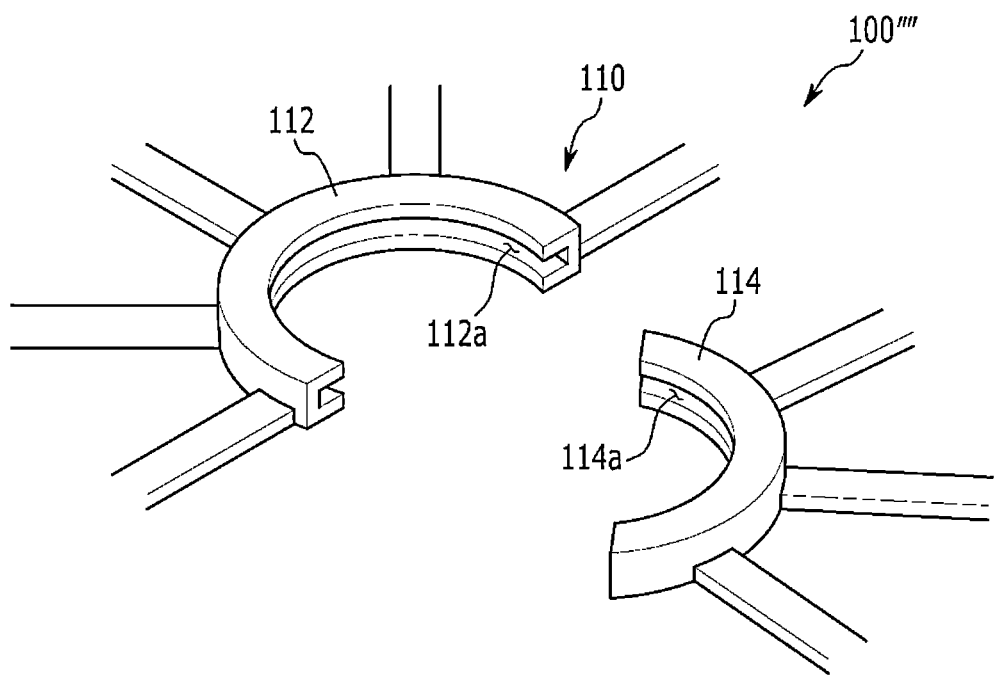
FIG. 9 is a partial enlarged view of a lifting jig according to a fifth embodiment in the offshore wind power generator installation system according to an embodiment of the present invention.
Figure 10:
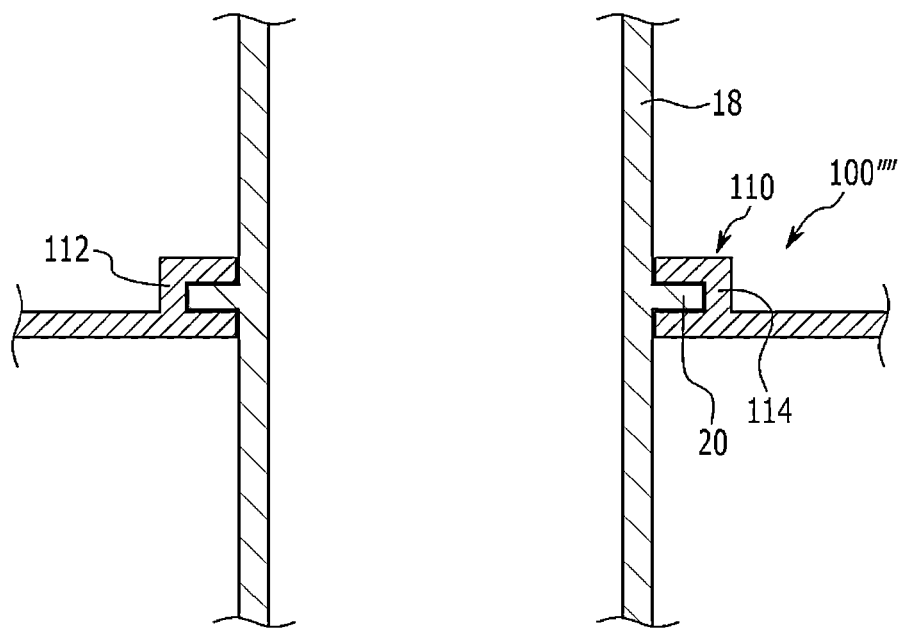
FIG. 10 is a partial sectional view illustrating a coupled state of the lifting jig depicted in FIG. 9 to the offshore wind power generator.

FIG. 9 is a partial enlarged view of a ring-shaped frame of a lifting jig 100'''' according to a fifth embodiment in the offshore wind power generator installation system 1 according to an embodiment of the present invention. FIG. 10 is a partial sectional view illustrating a coupled state of the lifting jig 100'''' depicted in FIG. 9 to the offshore wind power generator 10. In FIGS. 9 and 10, only a part of the ring-shaped frame of the lifting jig 100'''' is illustrated for simplicity of the drawings.

As shown in FIGS. 9 and 10, different from the lifting jig 100' according to the second embodiment in which the lifting jig 100' is positioned beneath the tower support structure 20 and is in contact with the bottom surface of the tower support structure 20 to support the wind power generator, the lifting jig 100'''' according to the fifth embodiment is structured such that arc-shaped coupling recesses 112*a* and 114*a* are formed at inner surfaces of the first arc-shaped frame 112 and the second arc-shaped frame 114 of the ring-shaped frame 110. Accordingly, when the lifting jig 100'''' is coupled to the tower support structure 20, the tower support structure 20 is inserted into the arc-shaped coupling recesses 112*a* and 114*a*.

If the first arc-shaped frame 112 and the second arc-shaped frame 114 are coupled to each other under the condition that the tower support structure 20 is inserted into the arc-shaped coupling recesses 112*a* and 114*a* formed at the inner surface of the first arc-shaped frame 112 and the second arc-shaped frame 114 as described above, the tower support structure 20 is coupled to the lifting jig 100'''' in such a manner that the tower support structure 20 is positioned inside the ring-shaped frame 110. Accordingly, the wind power generator is more securely coupled to the lifting jig 100''''.

The components other than the ring-shaped frame 110 of the lifting jig 100''' or 100'''' according to the fourth or fifth embodiment may be the same as the components of the lifting jig 100, 100' or 100" according to the first, second or third embodiment.

Hereinafter, a process of installing the offshore wind power generator at sea using the offshore wind power generator installation system constructed as above will be described with reference to the drawings.

FIGS. 11 through 15 are views illustrating a process of installing the offshore wind power generator according to an embodiment of the present invention at sea.

Figure 11:
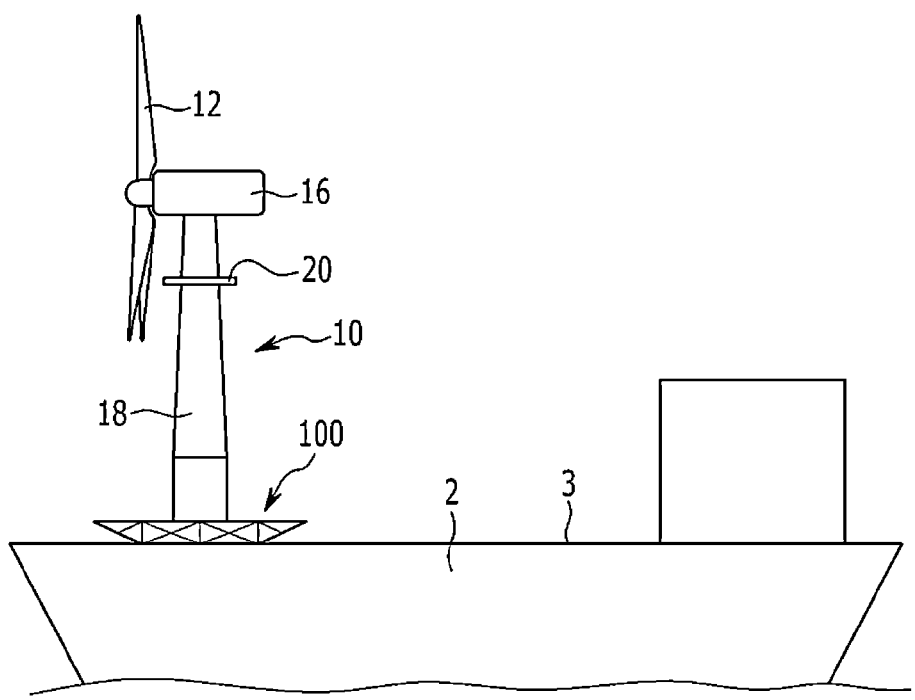
FIGS. 11 through 15 are views illustrating a process of installing the wind power generator at sea using the offshore wind power generator installation system according to an embodiment of the present invention.

Referring to FIG. 11, when it is intended to install the offshore wind power generator 10 at sea, the blade 12, the nacelle 16 and the tower 18 are integrally assembled on the land, and such an assembled wind power generator 10 is transported using a carrying ship 2.

The wind power generator 10 may be transported standing upright on a deck 3 of the carrying ship 2 as shown in FIG. 11, or may be transported lying down on the deck 3.

According to an embodiment of the present invention, when the offshore wind power generator 10 transported using the carrying ship 2 arrives at a desired region on the sea, the offshore wind power generator 10 is kept in a standing state on the deck 3 as shown in FIG. 11.

The lifting jig 100 is disposed on the deck 3 on which the offshore wind power generator 10 stands, so that the lower outer peripheral surface of the tower 18 is located inside the ring-shaped frame of the lifting jig 100.

At this time, the lifting jig 100 disposed on the deck on which the tower 18 is located may be one of the lifting jigs according to the above-described first through fourth embodiments. In this case, a radius of the inner peripheral surface of the ring-shaped frame of the lifting jig 100 should be greater than a radius of the outer peripheral surface of the lower end portion of the tower 18 so that the tower 18 can be positioned inside the inner peripheral surface of the ring-shaped frame of the lifting jig 100.

Figure 12:
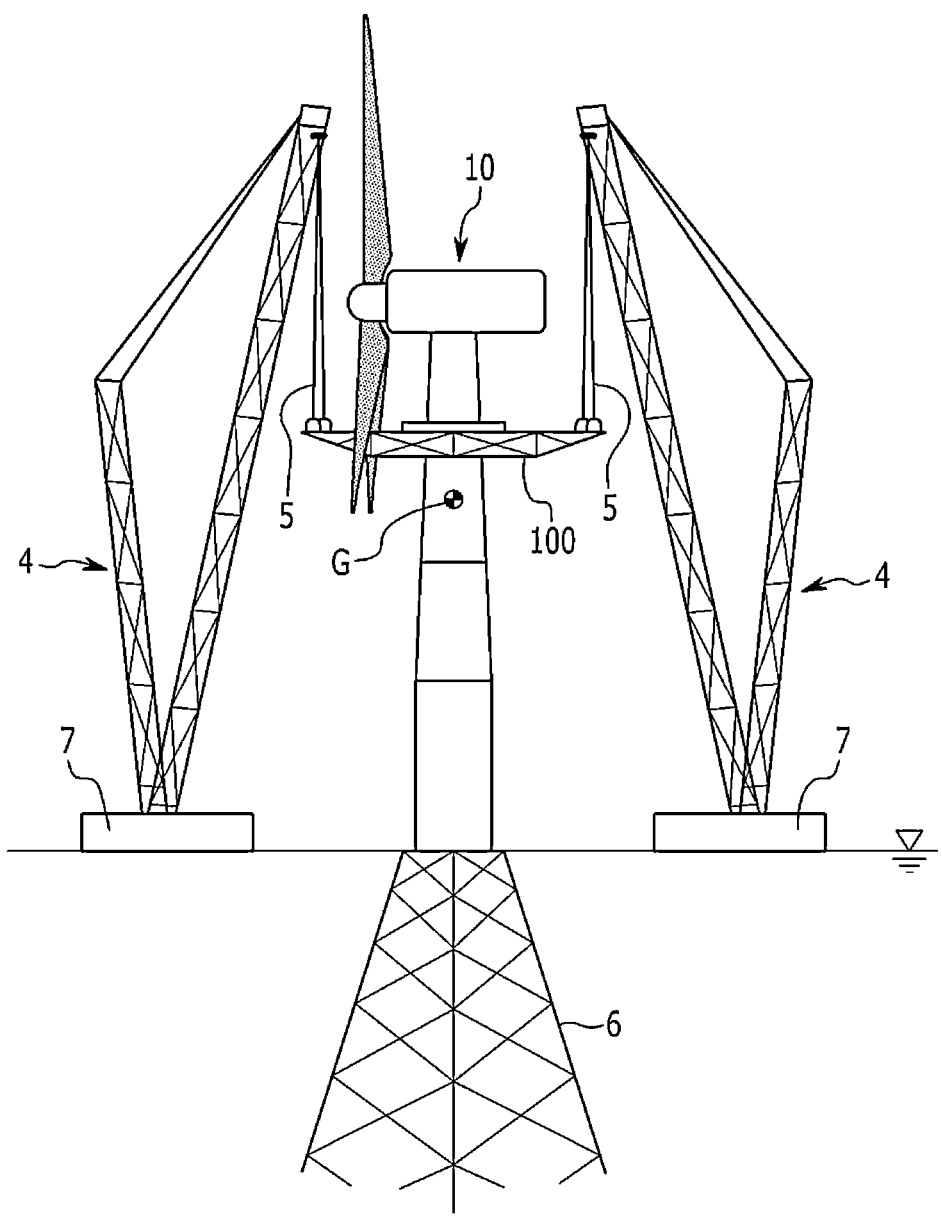

When it is intended to install the offshore wind power generator 10 at sea using the offshore wind power generator installation system 1 according to an embodiment of the present invention after positioning the lifting jig 100 on the deck 3, as shown in FIG. 12, both sides of the lifting jig 100 are lifted using two ships, to each of which a crane 4 is mounted.

In detail, a lifting ring is connected to an end portion of each of lifting wires 5 mounted to the crane 4, and the lifting ring is coupled to each of the ring coupling parts 130 (refer to FIG. 3) of the lifting jig 100, thereby lifting the lifting jig 100.

If the lifting jig 100 disposed on the deck of the ship is lifted, the lifting jig 100 moves up to the bottom surface of the tower support structure 20 of the wind power generator 10, and accordingly the top surface of the ring-shaped frame 110 (refer to FIG. 3) of the lifting jig 100 comes into contact with the bottom surface of the tower support structure 20.

At this time, a radius of the inner peripheral surface of the ring-shaped frame 110 should be smaller than a radius of the outer peripheral surface of the tower support structure 20 so that the ring-shaped frame 110 supports the tower support structure 20 while contacting the bottom surface of the tower support structure 20.

If the lifting jig is one of the lifting jigs 100, 100' and 100" according to the first through third embodiments, the lifting jig supports the tower support structure 20 under the condition that the top surface of the ring-shaped frame 110 is in contact with the bottom surface of the tower support structure 20.

If the lifting jig is the lifting jig 100''' according to the fourth embodiment described with reference to FIGS. 7 and 8, the lifting jig 100''' supports the tower support structure 20 under the condition that the top surface of the ring-shaped frame 110 is in contact with the bottom surface of the tower support structure 20 and the coupling protrusions 28 of the tower support structure 20 are fitted into the coupling holes 110a of the ring-shaped frame 110. If the lifting jig is the lifting jig 100'''' according to the fifth embodiment, different from the lifting jigs 100, 100', 100" and 100''' according to the first through fourth embodiments, the lifting jig 100'''' is not structured to contact the bottom surface of the tower support structure 20 of the offshore wind power generator 10 to lift the tower support structure 20. Instead, the lifting jig 100'''' is coupled to the tower support structure 20 in such a manner that the second arc-shaped frame 114 is separated from the first arc-shaped frame 112 of the lifting jig 100'''', the tower support structure 20 is inserted into the arc-shaped coupling recesses 112a and 114a of the first and second arc-shaped frames 112 and 114, and then the second arc-shaped frame 114 is coupled to the first arc-shaped frame 112 again.

According to an embodiment of the present invention, the lifting jig 100 is lifted using two cranes 4 under the condition that one of the lifting jigs according to the first through fourth embodiments is positioned beneath the offshore wind power generator 10 or the lifting jig according to the fifth embodiment is coupled to the tower support structure 20 of the offshore wind power generator 10.

In this embodiment, the reason of using two cranes 4 to lift the lifting jig is to keep the offshore wind power generator 10 standing upright in the lifted state.

If the offshore wind power generator 10 is lifted only using one came 4, because the center of gravity of the offshore wind power generator 10 is positioned at an eccentric position from the center of the offshore wind power generator, the tower of the offshore wind power generator may tilt. It is hard to install the offshore wind power generator in the tilted state.

Therefore, in the offshore wind power generator installation system 1 according to an embodiment of the present invention, both sides of the lifting jig 100 to lift the offshore wind power generator 10 are lifted using two cranes so that the lifting jig 100 is lifted while being kept parallel with the surface of the sea. If the wind power generator 10 is lifted by two cranes 4 which are positioned at the front and back of the wind power generator 10, a risk of the wind power generator overturning, which may occur due to the center of gravity positioned off-center in a forward and backward direction of the wind power generator, may decrease.

Figure 13:
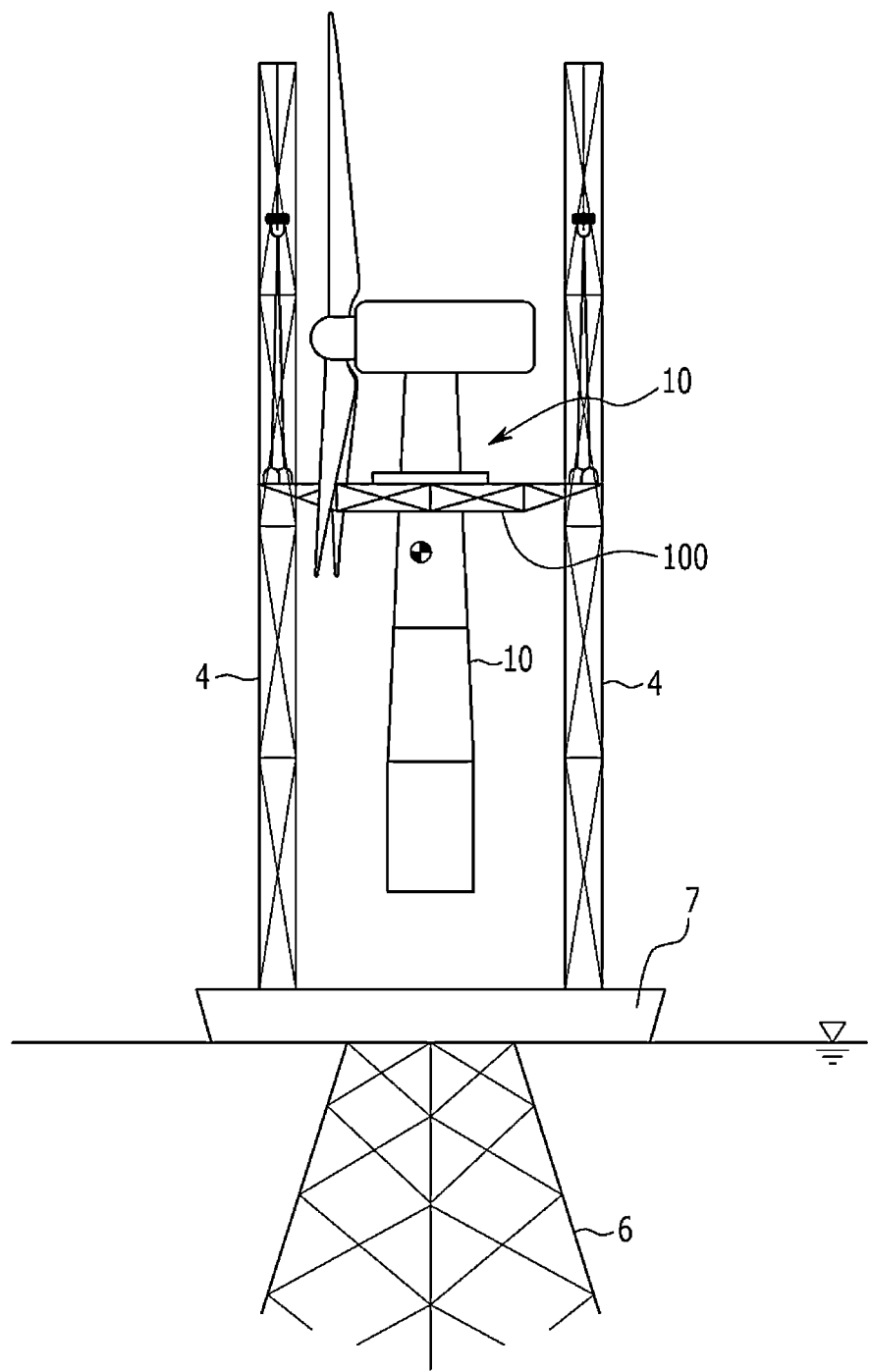
Figure 14:
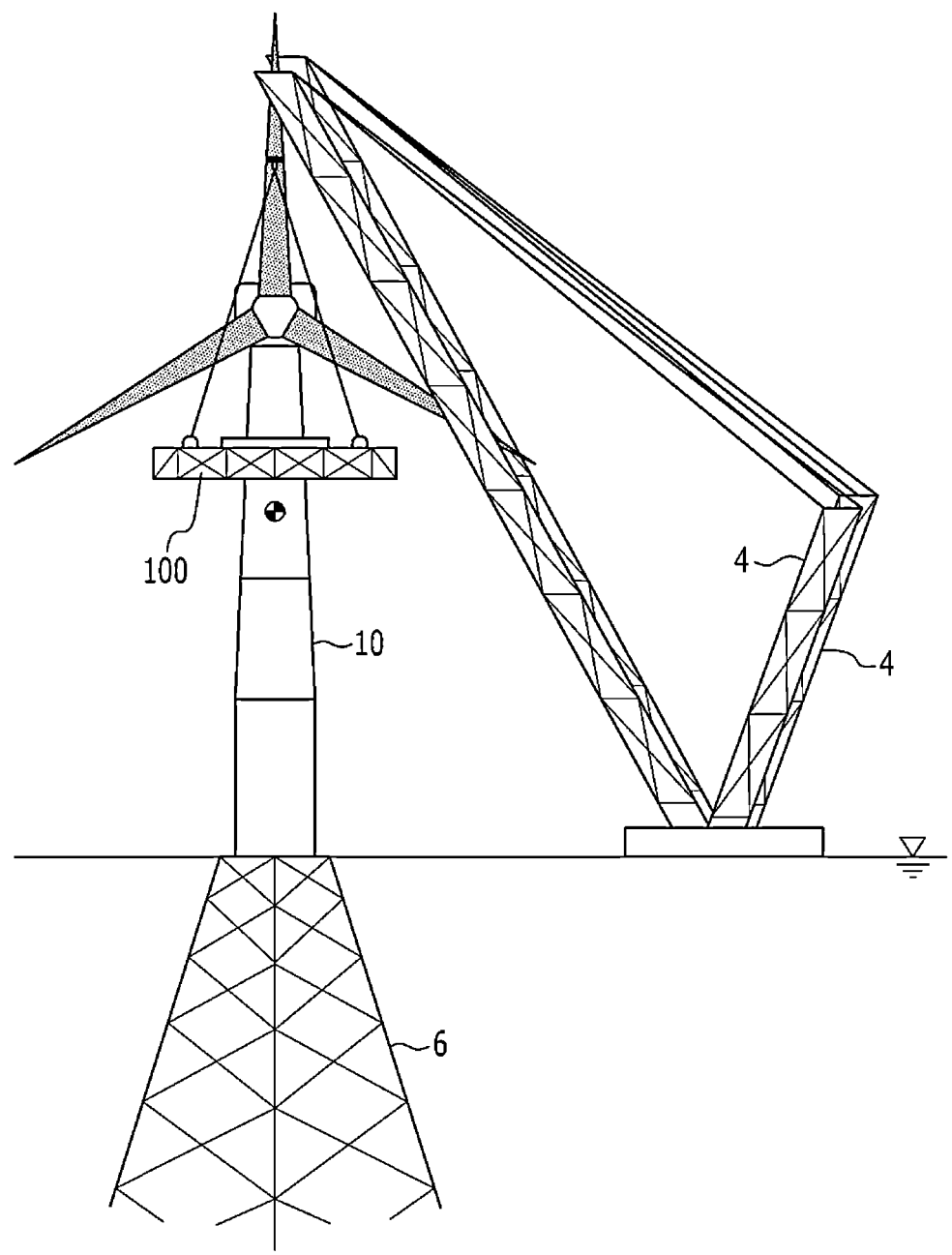

Although it has been described with reference to FIG. 12 that the lifting jig 100 is lifted in a horizontal state using two ships 7, it is also possible to lift the offshore wind power generator using one ship 7 if two separate cranes 4 are mounted to the ship 7 as illustrated in FIGS. 13 and 14.

Figure 15:
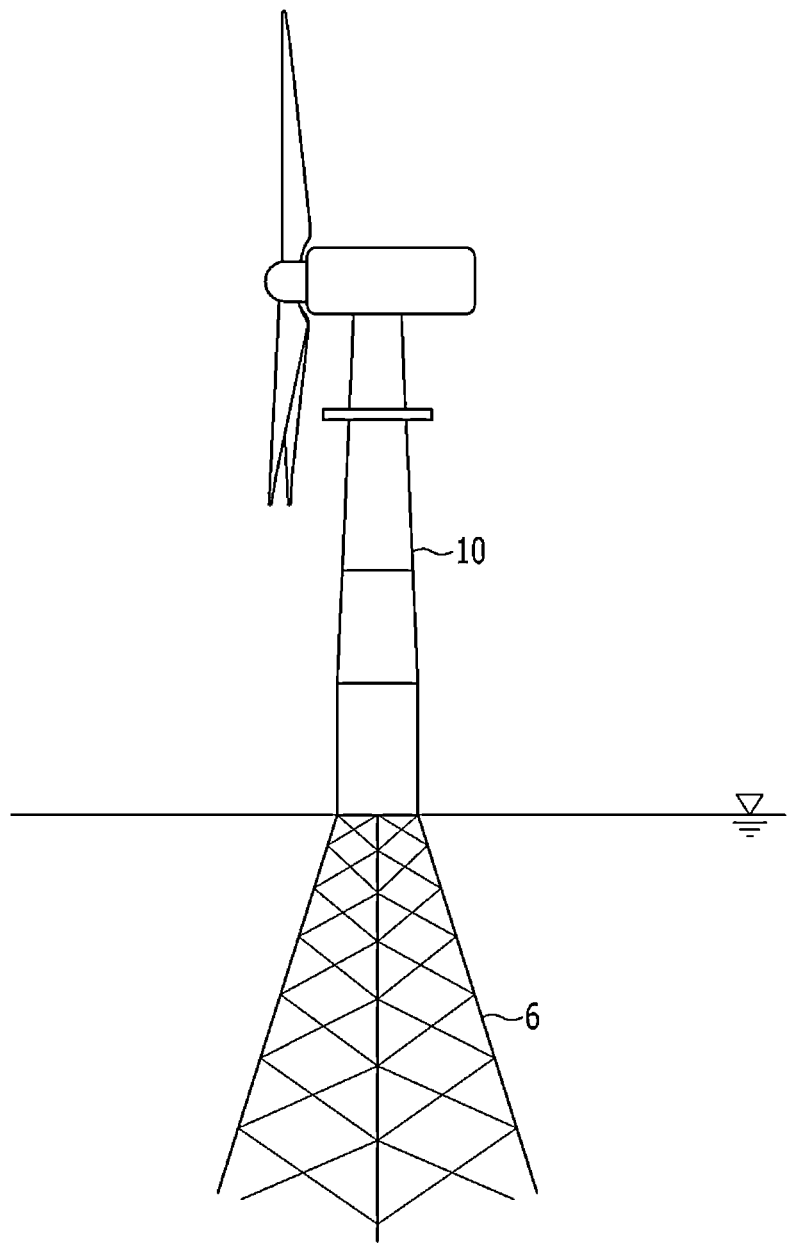

After the wind power generator 10 is lifted and transported using two cranes 4, as shown in FIG. 15, the wind power generator 10 is fixedly coupled to a connection part of the offshore foundation 6 which is installed to the seafloor and extends above the surface of the sea, thereby installing the wind power generator at sea.

After the wind power generator 10 is installed to the connection part of the offshore foundation 6, the lifting jig 100 is demounted from the wind power generator.

In the case of one of the lifting jigs 100, 100" and 100''' according to the first, third and fourth embodiments, the lifting jig is demounted from the tower of the offshore wind power generator by unfastening the coupling tools used to couple the components.

In the case of one of the connection/disconnection type lifting jigs 100' and 100'''' according to the second and fifth embodiments, the lifting jig is easily demounted from the tower 18 of the offshore wind power generator 10 by pivoting the first frame 142 to disconnect the second arc-shaped frame 114 from the first arc-shaped frame 112.

The lifting jig removed from the wind power generator 10 after being used for installation of the wind power generator is assembled again and reused to install other offshore wind power generators.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An offshore wind power generator installation system comprising:
   a tower support structure mounted to a tower of an offshore wind power generator and disposed above a center of gravity of the offshore wind power generator;
   a lifting jig to support the tower support structure of the offshore wind power generator; and
   a transport machine to lift the lifting jig at both sides of the tower,
   wherein the lifting jig includes a ring-shaped frame disposed around an outer peripheral portion of the tower of the offshore wind power generator in order to support the tower support structure mounted to the outer peripheral portion of the tower,
   wherein the ring-shaped frame includes a first arc-shaped frame and a second arc-shaped frame which are coupled to each other to form a ring shape, and
   wherein the first arc-shaped frame and the second arc-shaped frame are formed with coupling recesses at inner surfaces thereof, into which the tower support structure is inserted.

2. The offshore wind power generator according to claim 1, wherein the lifting jig includes:
   a support frame unit coupled to the ring-shaped frame in order to support the ring-shaped frame; and ring coupling parts formed at the support frame unit, to which a portion of the transport machine to transport the offshore wind power generator is coupled, wherein the support frame unit includes:
- a pair of first frames arranged near both sides of the ring-shaped frame in order to support the ring-shaped frame; and
- a pair of second frames to connect both end portions of the pair of first frames,
- wherein the ring coupling parts are formed at the pair of second frames.

3. The lifting jig according to claim 2, wherein the ring-shaped frame includes a first arc-shaped frame and a second arc-shaped frame which are coupled to each other to form a ring shape, the first arc-shaped frame is fixedly coupled to any one of the pair of first frames, and the second arc-shaped frame is coupled to the other one of the pair of first frames such that the second arc-shaped frame is separated from or coupled to the first arc-shaped frame.

\* \* \* \* \*